United States Patent [19]
Jeknavorian et al.

[11] Patent Number: 5,840,114
[45] Date of Patent: Nov. 24, 1998

[54] HIGH EARLY-STRENGTH-ENHANCING ADMIXTURE FOR PRECAST HYDRAULIC CEMENT AND COMPOSITIONS CONTAINING SAME

[75] Inventors: Ara Avedis Jeknavorian; Ahmad Arfaei, both of Chelmsford; Neal Steven Berke, N. Chelmsford, all of Mass.; David Charles Darwin, Columbia; Ellis Martin Gartner, Silver Spring, both of Md.; Leslie Ann Jardine, Ipswich, Mass.; James Franklin Lambert, Chestnut Hill, Mass.; Lawrence Reeder Roberts, Action, Mass.

[73] Assignee: W. R. Grace & Co.-Conn., New York, N.Y.

[21] Appl. No.: 648,970

[22] Filed: May 17, 1996

Related U.S. Application Data

[63] Continuation-in-part of Ser. No. 493,046, Jun. 21, 1995, abandoned, Ser. No. 493,036, Jun. 21, 1995, Ser. No. 504,089, Jul. 19, 1995, Pat. No. 5,634,966, and Ser. No. 505,985, Jul. 24, 1995, Pat. No. 5,665,158.

[51] Int. Cl.$^6$ ............................ C04B 22/08; C04B 24/04
[52] U.S. Cl. ......................... 106/802; 106/727; 106/728; 106/724; 106/808; 106/810; 106/819; 106/823; 524/2; 524/5; 524/650; 525/329.9; 526/262; 528/322

[58] Field of Search ...................... 106/724, 727, 106/802, 808, 810, 819, 823, 728; 524/2, 650, 5; 525/329.9; 526/262; 528/322

[56] References Cited

U.S. PATENT DOCUMENTS

| | | | |
|---|---|---|---|
| 4,496,506 | 1/1985 | Arfaei et al. | 106/724 |
| 5,393,343 | 2/1995 | Darwin et al. | 106/808 |
| 5,527,388 | 6/1996 | Berke et al. | 106/819 |
| 5,531,825 | 7/1996 | Gartner | 106/808 |

*Primary Examiner*—Michael Marcheschi
*Attorney, Agent, or Firm*—Craig K. Leon; William L. Baker

[57] ABSTRACT

A high early strength admixture for precast hydraulic cement comprises a calcium salt and a copolymer having a carbon-containing backbone to which are attached cement-anchoring members, such as carboxyl groups, and to which are also attached oxyalkylene pendant groups by linkages selected from the group consisting of amide and imide members. The copolymers used are preferably formed by reacting an acrylic polymer with ammonia or an alkoxylated amine. The calcium salt, preferably calcium nitrite, and the copolymer can be added simultaneously as one admixture, or separately. The invention relates also to methods for enhancing high early strength in concrete, cement, masonry, and mortar mixtures generally, and to precast concrete particarly, and also pertains to such hydraulic mixtures containing the calcium salt and copolymer.

20 Claims, No Drawings

HIGH EARLY-STRENGTH-ENHANCING ADMIXTURE FOR PRECAST HYDRAULIC CEMENT AND COMPOSITIONS CONTAINING SAME

This application is a continuation-in-part of U.S. Ser. No. 08/493,046 filed Jun. 21, 1995 now abandoned; Ser. No. 08/493,036 filed Jun. 21, 1995; Ser. No. 08/504,089 filed Jul. 19, 1995 now U.S. Pat. No. 5,634,966; and Ser. No. 08/505,985 filed Jul. 24, 1995 now U.S. Pat. No. 5,665,158, all assigned to the common Assignee hereof.

FIELD OF THE INVENTION

The present invention relates to additives for cementitious compositions, and more particularly to a hydraulic cement admixture that enhances high early strength, e.g., within the first 24 hours, in concrete, cement, masonry, and mortar compositions, and particularly in precast cement. High early strength is achieved by adding a calcium salt, such as calcium nitrite, and a copolymer having carbon-containing backbone comprising cement-anchoring groups, such as pendant carboxyl groups, and also having pendant oxyalkylene groups attached to the backbone by amide and/or imide linkages.

BACKGROUND OF THE INVENTION

The term "precast" concrete refers to a manufacturing process in which a hydraulic cementitious binder, such as Portland cement, and aggregates, such as fine and course sand, are placed into a mold and removed after curing, such that the unit is made and formed before delivery to a construction site.

In precast applications, it is desired that the cementitious mixture have sufficient fluidity that it flows through and around the reinforcement structure to fill out the mold and level-off at the top of the mold. Typically, the mold needs to be agitated to facilitate the levelling-off of the mixture, which requires time and effort. In spite of this need for flowability, however, is the equally important but opposed need for achieving high early strength. The term "high early strength" refers to the compressive strength of the cementitious mass within the first twenty four hours after pouring into the mold. Since precast concrete units are customarily removed from the mold at about 18 hours, it is highly desirable that the cementitious mixture be flowable but have high early strength before and by the first 18 hours.

SUMMARY OF THE INVENTION

The admixtures of the invention are useful in hydraulic concrete, masonry, cement, or mortar mixtures generally, and are believed especially suitable for use in achieving high early strength in precast concrete mixtures.

An exemplary high early strength cement admixture of the invention comprises (1) a calcium salt; and (2) a copolymer comprising a carbon-containing backbone having pendant cement-anchoring members, such as carboxyl groups, and pendant oxyalkylene attached to the backbone by linkages selected from an amides and imide. The calcium salt may comprise calcium nitrite, calcium nitrate, calcium chloride, calcium formate, or a mixture thereof. The copolymer to calcium salt ratio is preferably 1:0.5–20 s/s (solids on solids), and more preferably 1:7.5 s/s. The amount of copolymer that can be used is at least 0.005 weight percent, and usually in the range of 0.005 to 5, preferably 0.03 to 1.0 weight percent, and more preferably 0.1–0.25 s/s based on the weight of hydraulic cement binder in the composition.

An exemplary copolymer comprises a carbon containing backbone to which is attached groups shown by the structures (I) and (II), and optionally groups shown by structures (III) and (IV), as shown below (the structures altogether hereinafter "Formula J"):

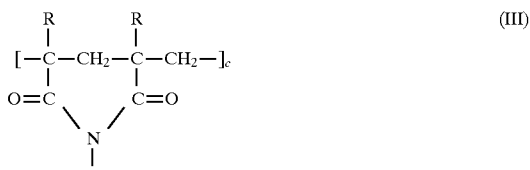

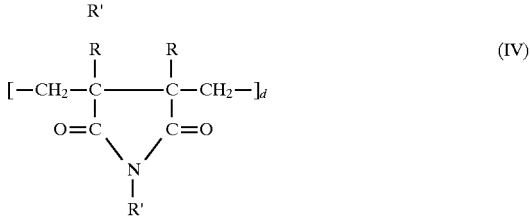

wherein each R independently represents a hydrogen atom or a methyl group (—CH$_3$) group; A represents hydrogen atom, a C$_1$–C$_{10}$ alkyl group, R' or an alkali metal cation or a mixture thereof; R' represents a hydrogen atom or a C$_2$–C$_{10}$ oxyalkylene group represented by (BO)$_n$R" in which O represents an oxygen atom, B represents a C$_2$–C$_{10}$ alkylene group, R" represents a C$_1$–C$_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100–a) and is preferably from 3 to 10; and b is not more than [100–(a+c+d)].

(The letter "B" is being used for lexographical convenience herein to denote an alkylene group. Those of ordinary skill in the art will realise that "B" herein does not represent boron).

In another preferred cement admixture of the invention, a preferred copolymer comprises a carbon-containing backbone to which is attached groups having structures (I) and (II), and optionally groups having structures (III) and (IV), as shown below (the structures altogether hereinafter "Formula J"):

-continued

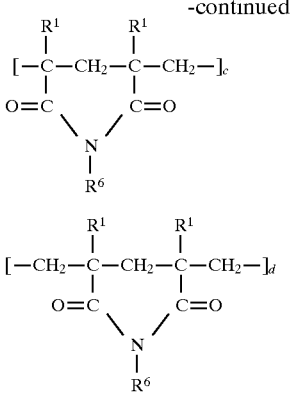

(III)

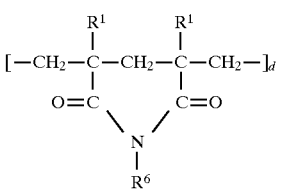

(IV)

wherein each R' independently represents a hydrogen atom or a $C_1$–$C_5$ alkyl (preferably methyl ($CH_3$—)) group; A represents a mixture of Z and $R^2$; Z represents hydrogen atom, monovalent or divalent metal cation, ammonium group or organic amine group; $R^2$ represents an air detraining polyoxyalkylene group represented by $(BO)_nR^3$ in which O represents an oxygen atom, B represents a $C_1$–$C_{10}$ alkylene group, $R^3$ represents a $C_1$–$C_{10}$ alkyl group and n represents an integer of from 1–200, or mixtures thereof; $R^6$ represents a polyoxyalkylene group represented by $(BO)_nR^3$; and a, b, c and d are numerical values representing molar percentage of the polymer's structure such that a is a value of about 1 to 99; the sum of c+d is a value of 0 to the numerical value of (100-a); and b is a remainder value of [100-(a+c+d)].

Exemplary methods of the invention for obtaining high early strength comprise combining a hydraulic cementitious composition with a calcium salt and a copolymer as described above. Preferably, this is done before pouring the cementitious mixture into a mold; and, most preferably, by incorporating the calcium salt and copolymer simultaneously in the form of a single admixture blend, such as in the addition water.

The invention is further directed to a hydraulic cement composition comprising the high early strength compositions above described.

DETAILED DESCRIPTION OF THE INVENTION

The term "cement composition" as may be used herein refers to pastes, mortars, grouts such as oil well cementing grouts, and concrete compositions comprising a hydraulic cement binder. The terms "paste", "mortar" and "concrete" are terms of art: pastes are mixtures composed of a hydraulic cement binder (usually, but not exclusively, Portland cement, and may also include fly ash, blast furnace slag, and silica fume or other materials commonly included in such cements) and water; mortars are pastes additionally including fine aggregate, and concretes are mortars additionally including coarse aggregate. The cement compositions of this invention may be formed by mixing required amounts of certain materials, e.g., a hydraulic cement, water, and fine or coarse aggregate, as may be applicable to make the particular cement composition being formed.

An exemplary admixture of the invention for achieving high early strength in cement compositions comprises (1) a calcium salt; and (2) a copolymer comprising a carbon-containing backbone to which are attached cement-anchoring members, such as carboxyl groups, and oxyalkylene groups attached to the backbone by linkages selected from the group of amide and imide linkages. The use of one or more of the amide and/or imide members to connect the oxyalkylene groups to the backbone will be further discussed hereinafter.

The calcium salt may comprise calcium nitrite, calcium nitrate, calcium chloride, calcium formate, or a mixture thereof. Calcium nitrite is preferred. Calcium nitrite is commercially available as a 30% (by weight) aqueous solution from W. R. Grace & Co.-Conn., Cambridge, Mass., under the name "DCI." In further exemplary embodiments, a combination of calcium nitrite and calcium nitrate may be employed.

A preferred copolymer suitable for use in the invention is taught in U.S. Pat. No. 5,393,343, assigned to W. R. Grace & Co.-Conn., and incorporated fully herein by reference. According to U.S. Pat. No. 5,393,343, the copolymer comprises an imidized "acrylic polymer," which term refers to a homopolymer or copolymer of acrylic acid, methacrylic acid, their alkali metal salts, as well as their $C_1$–$C_{30}$ alkyl esters. Additionally, the acrylic polymer reactant and the resultant imidized acrylic polymer may contain units derived from other singly and doubly ethylenically unsaturated monomers, such as styrene, alpha-methystyrene, sulfonated styrene, maleic acid, acrylonitrile, butadiene and the like. Such other ethylenically unsaturated monomer derived units, when present, can be present in the polymer in amount of up to about 20 (preferably, up to about 1 0) weight percent of the total polymer, provided that the resultant imidized acrylic polymer is water soluble.

An exemplary acrylic copolymer as described herein may be formed such as by reacting an acrylic polymer with ammonia or an alkoxylated amine. The amine reactant useful in forming the desired acrylic polymer can be selected from ammonia or an alkyl-terminated alkoxy amine represented by the formula:

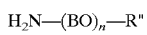

$H_2N$—$(BO)_n$—$R''$ in which BO represents a $C_2$–$C_{10}$ (preferably a $C_2$–$C_4$) oxyalkylene group in which O represents an oxygen atom and B represents a $C_2$–$C_{10}$ (preferably a $C_2$–$C_4$) alkylene group or mixture; and R" represents a $C_1$–$C_{10}$ (preferably $C_1$–$C_4$) alkyl group and n is an integer selected from 1 to 200 and preferably from 1 to 70. The reaction conditions and catalysts are known. See e.g.. U.S. Pat. No. 5,393,343 at Columns 3–4. Generally, one may obtain pendant groups shown by the structures (I)–(IV) above by heating the reactants in an aqueous solution at elevated temperatures of from about 150° C. to 250° C. (as discussed in U.S. Pat. No. 5,393,343 at Col. 3, 11. 46 et seq.), but structures (I) and (II) may be predominantly or solely formed (even to the exclusion of structures (III) and (IV) herein) by using temperature ranges lower than 150° C.

An exemplary copolymer for use in the invention comprises a carbon containing backbone having cement anchoring groups and oxyalkylene groups shown by the structures (I) and (II) and optionally having groups shown by structures (III) and (IV) (see e.g., U.S. Pat. No. 5,393,343 ), as shown below (the structures altogether hereinafter "Formula J"):

(I)

-continued

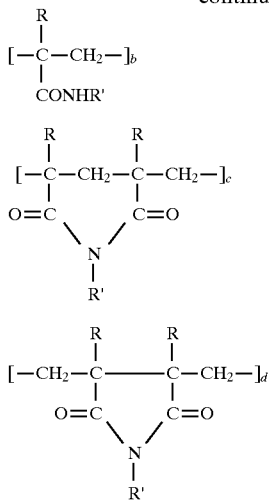

wherein each R independently represents a hydrogen atom or a methyl group (—CH$_3$) group; A represents hydrogen atom, a C$_1$–C$_{10}$ alkyl group, R' or an alkali metal cation or a mixture thereof; R' represents a hydrogen atom or a C$_2$–C$_{10}$ oxyalkylene group represented by (BO)$_n$R" in which O represents an oxygen atom, B represents a C$_2$–C$_{10}$ alkylene group, R" represents a C$_1$–C$_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100–a) and is preferably from 3 to 10; and b is not more than [100–(a+c+d)].

A preferred copolymer is represented by the above formula in which A is a hydrogen atom or an alkali metal cation; R' is at least from 50–90 weight percent of the polymer and comprises polyoxyethylene or polyoxypropylene units or mixtures thereof. Further, a may have a numerical value of from 60–70, and the sum of c and d is a numerical value of at least 3 (preferably at least 5) to the value of (100–a).

Other exemplary copolymers suitable for use in the invention may comprise a carbon backbone having intervening atoms like oxygen (i.e., ether linkage). Suitable grafting sites include free carboxylic acid (or salt thereof) groups. Carbon backbones may be made by polymerization of ethylenically-unsaturated monomers, preferably ethylenically-unsaturated carboxylic acids (e.g., allyl carboxylic acids) such as acrylic, methacrylic, maleic, fumaric, citraconic, itaconic, (meth) allylsulfonic, vinyl sulfonic, sulfoethyl(meth)acrylic, 2-(meth)acrylamido 2-methylpropane sulfonic, mesaconic, or dicarboxylic acid half-esters. Preferred polycarboxylic acid carbon backbones are, e.g., polyacrylic or polymethacrylic acid. 5- to 200-mers are preferred, more preferably 5- to 150-mers, and 5- to 100-mers particularly preferred. Preferably about 5% or more of the carboxylic acid groups on the polycarboxylic acid backbone remain unesterified, more preferably about 10% or more.

Exemplary polyoxyalkylene groups which may be covalently attached to the backbone of the copolymer may have the general formula $$R^4—(OA^2)_x—Q—$$

wherein

Q=O or NH;

A$^2$=C$_1$–C$_{10}$ alkylene;

x=1 to 200; and

R$^4$=C$_1$–C$_{10}$ alkyl.

The term alkyl(ene) is meant herein to encompass linear or branched alkyl(ene) groups, and also include (where structurally possible) aryl(ene) and arylalkyl(ene) groups. In preferred air detraining functional side chains, A$^1$=C$_2$–C$_5$ alkylene; more preferably, the OA$_2$ groups are a mixture of ethylene oxide ("EO") and propylene oxide ("PO"). It is noted that the polymer's ability to detrain air in the cement mixture appears to be particularly good when the weight ratio of EO/PO in the side chain is from about 3:1 to 0.3:1(70:30 to 30:70), more preferably from about 1.5:1 to 0.6:1. Q is preferably O and x is preferably 1 to 100. R$^4$ is advantageously butyl, preferably a n-butyl group. It is believed that a range of polyoxyalkylene alcohols available from Huntsman Chemical Corporation (Houston, Tex.) under the tradename JEFFOX™ will function suitably when incorporated as side chains in the imidized acrylic copolymers of the invention, e.g., JEFFOX™ WL5000 and WL660. These polyoxyalkylene alcohols have number average molecular weights of about 3500 and 1850, respectively, and have the formula (C$_4$H$_9$)(OA$^2$)$_x$OH, where OA$^2$ is a mixture of EO and PO, and the EO/PO weight ratio is ≈1:1.

Other exemplary polyoxyalkylene amines which can be grafted onto/attached to the carbon backbone of the copolymers herein may have the general formula $$R^5—O—(A^3O)_y—(A^3)_p—NH_2$$

wherein

A$^3$=C$_1$–C$_{10}$ alkylene;

y=1 to 200;

p=1 to 50; and

R$^5$=C$_1$–C$_{10}$ alkyl.

Such polyoxyalkylene amines may be grafted or attached to the carbon backbone by an amide and/or imide linkage, in which case the attached group would have the formula R$^5$—O—(A$^3$O)$_y$—(A$^3$)$_p$—N= (note that the "=" sign is meant to signify two covalent bonds to other atoms, for example, to two carbonyl carbons on the backbone, i.e., imide linkage, or to a hydrogen atom and a carbonyl carbon on the backbone.) In preferred polyoxyalkylene amines, A$^3$=C$_2$–C$_5$ alkylene; more preferably, the A$^3$O groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. R$^5$ is preferably methyl (CH$_3$—). For example, polyoxyalkylene amines available from Huntsman Chemical Corporation (Houston, Tex.) under the tradename JEFFAMINE™ have been found suitable in the invention, e.g., JEFFAMINE™ M1000 and M2070, having number average molecular weights corresponding to their respective product numbers. These commercially available polyoxyalkylene amines have the formula CH$_3$O(A$^3$O)$_y$CH$_2$CH (CH$_3$)NH$_2$, where A$^3$O is a mixture of EO and PO.

The mole ratio of polyacrylic acid to a) polyoxyalkylene amine and b) polyoxyalkylene alcohol is generally about 2:1 to 9:1, and the weight ratio of a) to b) is generally about 20:1 to 2:1. It can easily be seen that by varying the amount of the polyoxyalkylene alcohol side chains grafted onto the backbone, imidized acrylic copolymers can be made in accordance with the invention which will produce corresponding variance in entrained air in the cementitious mix. One preferred copolymer comprises polyacrylic acid ("PAA") to which has been grafted a) polyoxyalkylene amines of the formula CH$_3$O(A$^3$O)$_y$CH$_2$CH(CH$_3$)NH$_2$, where A$^3$O is a mixture of EO and PO and the EO/PO weight ratio is from about 5:1 to 0.5:1 and b) polyoxyalkylene alcohols of the formula $(C_4H_9)(OA^2)_xOH$, where $OA^2$ is a mixture of EO and PO and the EO/PO weight ratio is ≈1:1.

Other exemplary copolymers suitable for use in the invention may include exemplary polymers having groups with structures (I) and (II) and optionally structures (III) and/or (IV), as shown below (the structures altogether hereinafter "Formula K"):

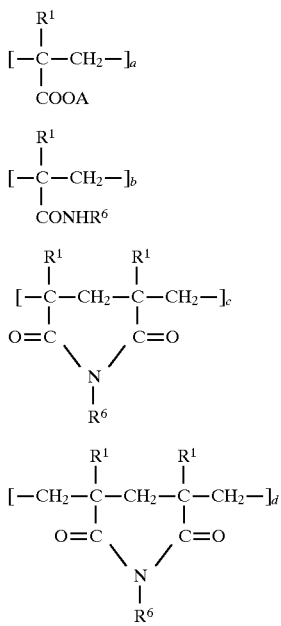

wherein each $R^1$ independently represents a hydrogen atom or a $C_1-C_5$ alkyl(preferably methyl ($CH_3$—)) group; A represents a mixture of Z and $R^2$; Z represents hydrogen atom, monovalent or divalent metal cation, ammonium group or organic amine group; $R^2$ represents an air detraining polyoxyalkylene group represented by $(BO)_nR^3$ in which O represents an oxygen atom, B represents a $C_1-C_{10}$ alkylene group, $R^3$ represents a $C_1-C_{10}$ alkyl group and n represents an integer of from 1–200, or mixtures thereof; $R^6$ represents a polyoxyalkylene group represented by $(BO)_nR^3$; and a, b, c and d are numerical values representing molar percentage of the polymer's structure such that a is a value of about 1 to 99; the sum of c+d is a value of 0 to the numerical value of (100−a); and b is a remainder value of [100−(a+c+d)].

a is preferably from about 30 to 99, more preferably from 50 to 99. In the $R^2$ group, B preferably represents a $C_2-C_5$ alkylene group, $R^3$ represents a $C_1-C_4$ allyl group, and n represents an integer of from 1–100. More preferably, the BO groups are a mixture of EO and PO. Air detraining performance appears to be particularly good when the weight ratio of EO/PO is from about 3:1 to 0.3:1(70:30 to 30:70), more preferably from about 1.5:1 to 0.6:1(60:40 to 40:60). $R^4$ is advantageously butyl, preferably a n-butyl group.

$R^6$ represents a polyoxyalkylene group represented by $(BO)_nR^3$, and is advantageously $R^5$—O—$(A^3O)_y$—$(A^3)$p—, wherein $A^3=C_1-C_{10}$ alkylene; y=1 to 200; p=1 to 50; and $R^5=C_1-C_{10}$ alkyl. Preferably, $A^3=C_2-C_5$ alkylene; more preferably, the $A^3O$ groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. $R^5$ is preferably methyl ($CH_3$—). In a particularly preferred embodiment, a) $R^6$ is of the formula $CH_3O(A^3O)_yCH_2CH$ ($CH_3$)—, where $A^3O$ is a mixture of EO and PO, and the EO/PO weight ratio is from about 5:1 to 0.5:1, and b) $R^2$ is of the $(C_4H_9)(OA^2)_xO$—, where $OA^2$ is a mixture of EO and PO and the EO/PO weight ratio is ≈1:1.

Exemplary copolymers described immediately above may be made by grafting a polyoxyalkylene amine onto a polycarboxylic acid backbone (amidization/imidization reaction), then grafting onto the polycarboxylic acid backbone an air detraining polyoxyalkylene alcohol (via esterification reaction). It is believed that the alcohol may also be grafted onto the backbone before grafting the amine onto the backbone. The reactions are carried out in an oxygen-free atmosphere, in a reaction vessel having a condenser for facilitating water removal, e.g., a jacketed-coiled condenser fitted with a DEAN-STARK™ trap. (During the course of the reactions, water (a reaction by-product) is removed to drive the reaction to completion.) In the amidization/imidization step, the reactants which are contacted with each other and heated to 100° C. to about 185° C. for about 1 to 8 hours, preferably about 1.5 to 2.5 hours, or until the amidization/imidization is complete. (Again, reference is made to U.S. Pat. No. 5,393,343, the entire disclosure of which is incorporated herein by reference for further details of the reaction.) For the esterification reaction, a catalyst is added to catalyze the esterification of the polyoxyalkylene alcohol to the graft polymer. Any agent which will catalyze ester formation may be used (i.e., dehydrating agents, defined herein as those which facilitate the formation of water in chemical reactions; such as naphthalene sulfonic acid, carbodiimide, or p-toluene sulfonic acid), with p-toluene sulfonic acid preferred. The temperature is maintained at 100° C. to about 185° C. for about 1 to 8 hours, preferably about 1.5 to 2.5 hours, or until the esterification is complete. Water by-product is removed as above. The reaction vessel is cooled, the reaction product is neutralized and the total solids of the mixture are adjusted with solvent if desired or necessary for addition to a cement composition in a desired dosage. Other methods of preparation may be used as long as the resultant polymer has the characteristics described herein. For example, certain polyoxyalkylene-containing polymers of the type obtained by polymerization of ethylenically-polymerizable carboxylic acids and ethylenically-polymerizable polyoxyalkylenes, as exemplified by U.S. Pat. Nos. 4,471,100 and 4,946,904, the entire disclosures of which are incorporated herein by reference, comprise a carbon backbone and grafting sites (carboxylic acid groups). It is intended that air detraining functional side chains as described herein may be esterified to the free carboxylic acid groups of these polyoxyalkylene groups to impart the benefits detailed herein. Such resulting acrylic copolymers having such groups are intended to be within the scope of our invention.

Commercially available copolymers suitable for use in the invention, and falling within the description above, are available from W. R. Grace & Co-Conn. under the tradename "ADVA."

In further exemplary embodiments of the invention, the copolymers can be formed at any stage of the cement or mortar's formation or use. For example, the polymer, with or without the calcium nitrite, can be mixed at the cement mill with clinker cement raw material during its grinding to form cement powder. The polymer can also be applied to the cement powder, with or without the calcium nitrite, during its blending with other dry materials to prepare a specific type of cement, such as blended cement, pozzolanic cement and the like. Alternately, improved cements of the invention can be formed in situ during the course of preparing a cement composition such as a mortar mix or a concrete. The copolymer, preferably in premixed form together with a calcium salt, such as calcium nitrite, can be added as an aqueous solution as part of the water of hydration, or can be added separately.

An exemplary method of the invention for obtaining high early strength in a concrete, cement, masonry, or mortar mix comprises combining a hydraulic cementitious composition with calcium nitrite and copolymers, as described above. As previously mentioned, the calcium nitrite to copolymer ratio is 1:0.5–20 s/s (solids on solids), and more preferably it is 1:7.5 s/s. Preferably, the calcium nitrite and copolymer are added to the cement, and intermixed, before the mixture is poured into a mold; and, most preferably, by incorporating the calcium nitrite and copolymer simultaneously in the form of a single admixture blend. The admixtures can be added separately or simultaneously with the addition water. The present invention is further directed to a hydraulic cement composition comprising a hydraulic cementitious binder, such as Portland cement, and a calcium salt and copolymer as previously described. In precast applications, the water to cement ratio will be equal to, or less than, 0.45 by weight (water:cement).

Exemplary copolymers in accordance with the invention can be made as follows. Polycarboxylic acid (MW≈5000), polyoxyalkylene alcohol, and polyoxyalkylene amine are combined in a reaction vessel equipped with a $N_2$ sweep, mechanical stirrer and a jacketed-coiled condenser fitted with a DEAN-STARK™ trap. The polyoxyalkylene amine is grafted onto the polycarboxylic acid backbone at 140° C. to 185° C. for two hours. p-toluene sulfonic acid was added as an esterification catalyst, and the reaction mixture was heated for an additional two hours, to allow for the esterification of polyoxyalkylene alcohol onto the polycarboxylic acid backbone. Upon cooling to ≈50° C., the reaction product was neutralized with 40% (wt/wt) aqueous NaOH and total solids adjusted to 40% with deionized water.

As previously mentioned, copolymers having oxyalkylene groups attached to the carbon containing backbone useing primarily or predominantly amide linkages (see "structures" designated as "II" above) can be formed by grafting oxyalkylene amines onto polycarboxylic acids at temperatures below 140° C. It is believed possible that amide linkages (e.g., structure (II) could be used to the total exclusion of imde linkages (e.g., structures III and IV).

Still further exemplary acrylic copolymers suitable for use in the invention may include polymers having the general formula (I) and (II), and optionally (III), (IV), and (V), as shown below (the structures altogether hereinafter "Formula L"):

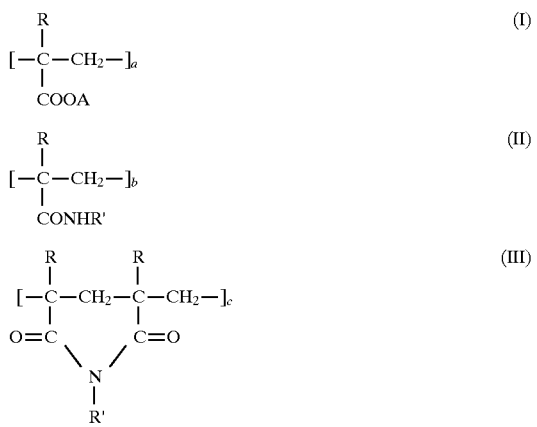

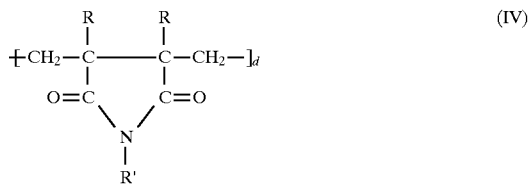

wherein each R independently represents hydrogen atom or a methyl ($CH_3$—) group; A represents hydrogen atom, a $C_1$–$C_{10}$ alkyl group, R' or an alkali or alkaline earth metal cation or a mixture thereof; R' represents a hydrogen atom or a $C_2$–$C_{10}$ (preferably $C_2$–$C_4$) oxyalkylene group or a plurality (1–200, preferably from 1 to 70) of said groups which is terminated with a $C_1$–$C_{10}$ alkyl group (R") or mixtures thereof; $HZ^{(+)}$ represents an ammonium cation wherein Z is a group $X_2N$ ($BO_2$)R'" such that X represents hydrogen, ($BO_2$)R'" or mixtures thereof and R'" represents H, $C_1$–$C_{10}$ alkyl group or $BNH_2$; B represents a $C_2$–$C_{10}$ alkylene (preferably $C_2$–$C_4$ alkylene) group or mixture of said groups and z is from 5 to 200 (preferably 10 to 100, and most preferably from 10 to 50); and a, b, c, d and e represent molar percentages of the polymer's structure such that a plus e has a value of about 50 to 70; the sum of c plus d is at least 2 to a value of [100−(a+e)] and is preferably from 3 to 10; and b is not more than [100−(a+c+d+e)] and e is 0.1 to 10.

The amine reactant useful in forming the just described acrylic copolymer can be selected from ammonia or an alkyl-terminated poloxyalkylene amine represented by the formula:

$$H_2N—(BO)_n—R" \quad (L1)$$

in which BO represents a $C_2$–$C_{10}$ (preferably a $C_2$–$C_4$) oxyalkylene group in which O represents an oxygen atom and B represents a $C_2$–$C_{10}$ (preferably a $C_2$–$C_4$) alkylene group or mixture; and R" represents a $C_1$–$C_{10}$ (preferably $C_1$–$C_4$) alkyl group and n is an integer selected from 1 to 200 and preferably from 10–120.

In addition to the polyoxyalkylene amine reactant, the acrylic polymer can be further formed with hydroxy terminated polyoxyalkylenes represented by the formula $$HO—(BO)_n—R" \quad (L2)$$

wherein BO, R" and n are defined as in formula (L1) above. The hydroxy terminated compound, when present, is normally used in a mole ratio of amine terminated to hydroxy terminated compound of from about 0.5 to 1.5, preferably from about 1 to 1.5. The compounds of the formula (L2) react with the carboxyl groups of the acrylic polymer to provide a portion of the A constituent of the amidized/imidized acrylic polymer product of the immediately preceding structures (I)–(V) above.

The polymer shown by Formula L can also contain small amounts of derivatives of compounds L1 and L2 in which R" of compound L1 is a primary amino group and R" of compound L2 is a hydroxyl group. Such derivatives have the formula Z(BO)$_n$Z where each Z is a primary amino or a hydroxyl group. The resultant polymer provides extended high slump properties. These derivatives may be present in up to 8 percent, preferably up to 5%, provided that the resultant product remains water soluble.

The total polyoxyalkylene containing reactants are normally used in from about 5 to 90 mol percent and preferably from 10 to 20 mol percent based on the acrylic acid units present in the acrylic polymer.

The acrylic polymer and amine reactants alone or further combined with a hydroxy terminated reactant form the copolymer by heating the reactants either in an aqueous solution or neat at elevated temperatures of from about 60 degrees C. to 250 degrees C. and most preferably from 100 degrees C. to 225 degrees C. The reaction is carried out under ambient pressure or, under a pressure lower than ambient pressure. Further, when the reaction is carried out under ambient or substantially ambient pressure it is preferred to conduct the reaction while passing air or nitrogen gas over the liquid reaction medium or by bubbling the gas through the medium to remove water and other low molecular weight by-products from the reaction zone.

The optimum condition will depend on the particular reactants used and the degree of reaction desired. The exact condition can be determined by simple experimentation.

The imidization reaction can be enhanced by conducting the reaction in the presence of a basic catalyst, an acid catalyst and/or a transamination catalyst. Such catalysts may be selected from a tertiary amine, such as dicyclohexylamine, 1,1,3,3-tetramethylguanidine, 1,3-diphenylguanidine, quinoline, isoquinoline, 4-benzylpyridine, 4-phenylpyridine, 2,3-benzodiazine, 1,4-benzodiazine, 1-benzazine, 1,3-benzodiazine, N,N'-dicyclohexylcarbodiimide, 2,2'-bipyridyl, 2,3'-bipyridyl, 2,4'-bipyridyl or such catalyst can be selected from the group consisting of p-toluenenesulfonic acid, HCl, $Sb_2O_3$, Ti—$(OC_4H_9)_4$, $NaNH_2$, $SnO_2$, potassium or sodium alkoxides, manganese acetate, and the like. The catalyst can be present in amounts of from 0.1 to 5 weight percent based on the amine reactant.

The reactants are contacted with each other at the above described reaction conditions for from about 1 to 8 hours and preferably from about 1.5 to 3 hours. During the course of the reaction, water (a by-product) is removed to drive the reaction to imidization. When the reaction is carried out at embient or substantially ambient pressure, the removal of water can be enhanced by sweeping a gas, such as nitrogen, through the reaction zone.

The degree of reaction can be substantially monitored by the amount of water removed from the reaction zone. Upon completion of the reaction, the reaction product is cooled and filtered.

The imidized acrylic polymer is normally a high-boiling viscous liquid which is substantially soluble in water. The initially formed polymer is taken up in an aqueous solution. The pH of the solution is adjusted or maintained to below 6.5, preferably from about 3 to 6 and most preferably from 3 to 5. An amine terminated polyoxyalkylene is introduced into the aqueous solution to provide an ammonium salt with at least a portion of the remaining free carboxylic acid units of the polymer. The amine terminated polyoxyalkylene used to produce the salt is preferably selected compounds of the formula

$X_2N(BO)_zR'''$ wherein X represents hydrogen, $(BO)_zR'''$ or mixtures thereof and $R'''$ represents H, $C_1$–$C_5$ alkyl group or $BNH_2$; B represents a $C_2$–$C_{10}$ alkylene (preferably $C_2$–$C_4$ alkylene) group or mixture of said groups and z is from 5 to 200 (preferably 10 to 100 and most preferably from 10 to 50).

The molar amount of acrylic acid-ammonium polyoxyalkylene units which are present in the polymer admixture (represented by "e") may range from about 0.1 to 10 and preferably from about 0.2 to 2.

It has been unexpectedly found that the presence of units "e" of the subject polymer admixture provide superplasticizer properties with the ability of the achieving air content (in the form of microvoids) of less than 5 percent by volume and preferably less than 3 volume percent in concrete compositions. Similarly, the subject polymer can achieve reduced air content in mortar compositions of less than 6 percent and preferably less than 4 percent. If higher amounts of air content are desired, the cement composition can be treated with conventional air entrainers. The present polymer does not detract from conventional air entrainer activity. The exact molar amount of units "e" to achieve the air controlling properties will depend upon the exact nature and molar proportion of the other components of the polymer admixture as well as the nature of the cement composition being treated. The molar amount of units "e" need to achieve a desired air entrainment level can be readily determined by experimental design with the aid of the present teaching.

The following examples are given for illustrative purposes only and are not meant to be a limitation on the claims appended hereto. All parts and percentages are by weight unless otherwise indicated.

EXAMPLE 1

A mixer drum was prepared by wetting it with water and inverting the drum to allow its interior to drain. The drum was righted and loaded with ordinary Portland Cement (OPC), water, fine aggregate (sand), and coarse aggregate (stone) at the following addition rates: stone at the rate of 1750 lbs./$yd^3$; sand at the rate of 1230 lbs./$yd^3$; water at the rate of 320 lbs./$yd^3$ ; and cement at the rate of 658 lbs/$yd^3$. The sand and stone conformed to the standard specification for concrete aggregates in accordance with ASTM C 33 (1993). The drum was mixed in accordance with standard practice for making and curing test specimens in the laboratory (ASTM C-192-90A), then placed into cylinder molds (steel) having a four inch diameter and eight inch length.

In addition to control samples, samples having calcium nitrite, an imidized acrylic copolymer, and both the calcium nitrite with the copolymer were produced. The additives were introduced into the sample by incorporating them into the water component of the sample. The calcium nitrite ("DCI" from W. R. Grace & Co.-Conn., Cambridge, Mass.) was used at the addition rate of 0.2–4.0 % s/s based on the cement (solid calcium nitrite/solid cement, s/s). The copolymer ("ADVA" from Grace, in accordance with Formula K described above) was used at the addition rate of 0.05–0.5% s/s based on solids cement. In the samples containing "ADVA" only and the DCI/ADVA combination, since the "ADVA" operates as a superplasticizer to fluidity the mixture, the rate of addition of water was decreased to 250 lbs./$yd^3$, and the rate of addition of sand was increased to 1400 lbs./$yd^3$ to adjust for yield.

The control samples and test samples were cast into the cylinders, left undisturbed, and stripped from the molds at periodic intervals of 6, 10, 14, and 18 hours. The samples were subjected to a standard test method for measuring compressive strength cylindrical concrete specimens (ASTM-C-39-94) in which an axial load is applied until the samples crack, and the compressive strength in terms of pounds per square inch (psi) is determined. The results are presented in Table 1 below. Sample 1 ("control") had no calcium nitrite or the acrylic polymer; Sample 2 ("DCI") had calcium nitrite only; Sample 3 ("ADVA") had the imidized acrylic polymer only; and Sample 4 (DCI/ADVA) had both the calcium nitrite and the copolymer demonstrated a synergistic effect in achieving high early strength at the indicated intervals. The "net" compressive strength values are computed by substracting the control values. For example, Sample #2 yielded a strength value of 123 psi at 6 hours, but the "net" strength value is "85" psi when the control value of 38 psi is substracted.

TABLE 1

| SAMPLE | 6 Hour (psi) | 10 Hour (psi) | 14 Hour (psi) | 18 Hour (psi) |
|---|---|---|---|---|
| #1 (control) | 38 | 195 | 551 | 943 |
| #2 (DCI only) | 123 | 702 | 981 | 1499 |
|  | (85 net) | (507 net) | (430 net) | (556 net) |
| #3 (ADVA only) | 52 | 106 | 485 | 1205 |
|  | (14 net) | (0 net) | (0 net) | (262 net) |
| #4 (DCI/ADVA) | 342 | 1144 | 1862 | 2636 |
|  | (304 net) | (949 net) | (1311 net) | (1693 net) |

We claim:

1. A cement admixture for achieving high early strength comprising: (1) a calcium salt; and (2) a copolymer comprising a carbon-containing backbone having (a) pendant cement-anchoring members and (b) pendant oxyalkylene groups attached to the backbone by linkages selected from the group consisting of amide and imide.

2. The admixture of claim 1 wherein said calcium salt comprises calcium nitrite, calcium nitrate, calcium chloride, calcium formate, or a mixture thereof.

3. The admixture of claim 2 wherein said calcium salt comprises calcium nitrite.

4. The admixture of claim 1 wherein said admixture has a ratio of copolymer to calcium salt of 1:0.5–20 s/s.

5. The admixture of claim 3 wherein said admixture has a ratio of copolymer to calcium salt of 1:7.5 s/s.

6. The admixture of claim 5 wherein the amount of copolymer used is at least 0.005 weight percent.

7. The admixture of claim 1 wherein said copolymer is formed by reacting an acrylic polymer with ammonia or an alkoxylated amine represented by the formula

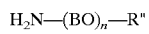

wherein BO represents a $C_2$–$C_{10}$ oxyalkylene group in which O represents an oxygen atom and B represents a $C_2$–$C_{10}$ alkylene group or a mixture thereof; and R" represents a $C_1$–$C_{10}$ alkyl group and n is an integer selected from 1 to 200.

8. The admixture of claim 1 wherein said copolymer comprises a carbon containing backbone to which are attached groups shown by the following structures (I) and (II) and optionally (III) and (IV):

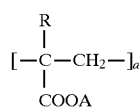

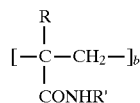

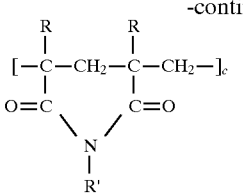

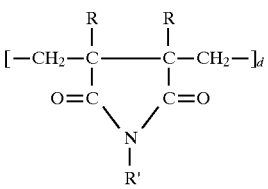

wherein each R independently represents a hydrogen atom or a methyl group (—$CH_3$) group; A represents hydrogen atom, a $C_1$–$C_{10}$ alkyl group, R' or an alkali metal cation or a mixture thereof; R' represents a hydrogen atom or a $C_2$–$C_{10}$ oxyalkylene group represented by $(BO)_n R''$ in which O represents an oxygen atom, B represents a $C_2$–$C_{10}$ alkylene group, R" represents a $C_1$–$C_{10}$ alkyl and n represents an integer of from 1–200; and a, b, c, and d are numerical values representing molar percentage of the polymer's structure such that a is a value of about 50–70; the sum of c plus d is at least 2 to a value of (100–a); and b is not more than [100–(a+c+d)].

9. The admixture of claim 8 wherein said copolymer contains at least one group from the structures (III) or (IV):

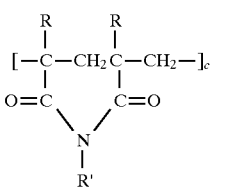

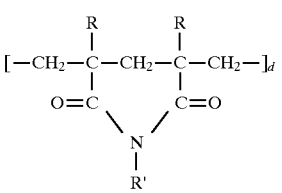

wherein each R independently represents a hydrogen atom or a methyl group (—$CH_3$); group A is a hydrogen atom or an alkali metal cation; R' is at least from 50–90 weight percent of the polymer and comprises polyoxyethylene or polyoxypropylene units or mixtures thereof; a has a numerical value of from 60–70, and the sum of c and d is a numerical value of at least 3 to the value of (100–a).

10. The admixture of claim 1 wherein said copolymer is formed by reacting an acrylic polymer with ammonia or an alkoxylated amine represented by the formula

wherein
Q=O or NH;
$A^2$=$C_1$–$C_{10}$ alkylene;
x=1 to 200; and
$R^4$=$C_1$–$C_{10}$ alkyl.

11. The admixture of claim 10 wherein said copolymer comprises a carbon-containing backbone having (a) attached cement-anchoring members and (b) oxyalkylene groups attached to the backbone by a linkage selected from amide or imide and wherein the attached groups have the structures (I) and (II), and optionally structures (III) and (IV):

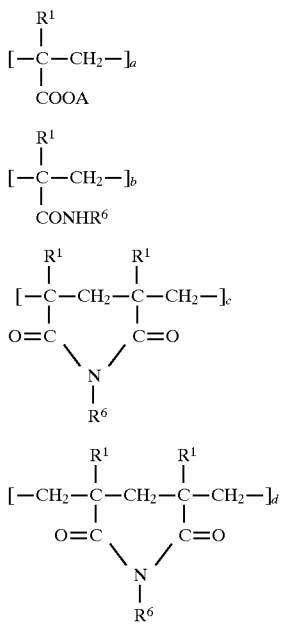

wherein each $R^1$ independently represents a hydrogen atom or a $C_1$–$C_5$ alkyl (preferably methyl ($CH_3$—)) group; A represents a mixture of Z and $R^2$; Z represents hydrogen atom, monovalent or divalent metal cation, ammonium group or organic amine group; $R^2$ represents an air detraining polyoxyalkylene group represented by $(BO)_n R^3$ in which O represents an oxygen atom, B represents a $C_1$–$C_{10}$ alkylene group, $R^3$ represents a $C_1$–$C_{10}$ alkyl group and n represents an integer of from 1–200, or mixtures thereof; $R^6$ represents a polyoxyalkylene group represented by $(BO)_n R^3$; and a, b, c and d are numerical values representing molar percentage of the polymer's structure such that a is a value of about 1 to 99; the sum of c+d is a value of 0 to the numerical value of (100–a); and b is a remainder value of [100–(a+c+d)].

12. The admixture of claim 11 wherein said copolymer comprises an imidized acrylic polymer and contains at least one of the structures (III) or (IV).

13. The composition of claim 7 wherein said B represents a $C_2$–$C_4$ alkylene group or a mixture thereof.

14. The composition of claim 11 wherein said calcium salt comprises calcium nitrite.

15. A method for improving early high strength comprising introducing into a hydraulic cementitious mixture (1) a calcium salt and (2) a copolymer having a carbon-containing backbone to which are attached (a) cement-anchoring members and (b) oxyalkylene pendant groups attached to the backbone by linkages selected from amide or imide.

16. The method of claim 15, wherein said calcium salt and said copolymer are added simultaneously as a one-component admixture, said admixture having a ratio of copolymer to calcium salt of 1:0.5–20 s/s.

17. A cement composition having improved high early strength comprising a hydraulic cement, a calcium salt, and a copolymer having a carbon-containing backbone to which are attached (a) cement-anchoring members and (b) oxyalkylene pendant groups attached to the backbone by linkages selected from amide or imide linkages.

18. The cement composition of claim 17 wherein said composition further comprises water and has a water:cement weight ratio of no greater than 0.45:1.

19. The cement composition of claim 18 wherein said calcium salt comprises calcium nitrite.

20. The admixture of claim 1 wherein said copolymer having a carbon-containing backbone comprises polyacrylic or polymethacrylic acid.

* * * * *